(12) United States Patent
Wenzel et al.

(10) Patent No.: US 7,371,360 B2
(45) Date of Patent: May 13, 2008

(54) PHYLLOSILICATE-INTERCALATION COMPOUNDS

(75) Inventors: Antje Wenzel, Hofstetten (DE); Arne Reinheimer, Zellerberg (DE)

(73) Assignee: Hilti Aktiengesellschaft, Schaan (LI)

( * ) Notice: Subject to any disclaimer, the term of this patent is extended or adjusted under 35 U.S.C. 154(b) by 777 days.

(21) Appl. No.: 10/737,279

(22) Filed: Dec. 16, 2003

(65) Prior Publication Data

US 2004/0183051 A1    Sep. 23, 2004

(30) Foreign Application Priority Data

Dec. 17, 2002   (DE) ................ 102 59 084

(51) Int. Cl.
*C01B 33/12*    (2006.01)
(52) U.S. Cl. .................................... 423/335
(58) Field of Classification Search ............... 423/335, 423/338; 252/378 R
See application file for complete search history.

(56) References Cited

U.S. PATENT DOCUMENTS

| | | | |
|---|---|---|---|
| 3,758,415 A | 9/1973 | Wada et al. | |
| 4,156,533 A | 5/1979 | Close et al. | |
| 4,305,992 A | 12/1981 | Langer et al. | |
| 4,956,121 A | 9/1990 | Tymon et al. | |
| 5,326,500 A | 7/1994 | Friedman et al. | |

FOREIGN PATENT DOCUMENTS

| | | |
|---|---|---|
| DE | 69517289 | 12/2000 |
| DE | 69615090 | 6/2002 |
| EP | 0429246 | 5/1991 |
| WO | 0219472 | 3/2002 |

OTHER PUBLICATIONS

K. Jasmund and G. Lagaly (Hrsg.) "Tonminerale und Tone" (Clay Minerals and Clays), Darmstadt, Dr. Dietrich Steinkopff Verlag GmbH & Co. KG, 1993, pp. 129-152.
Patent Abstract of Japan, JP-09227119, Sep. 2, 1997.

*Primary Examiner*—Edward M. Johnson
(74) *Attorney, Agent, or Firm*—Abelman, Frayne & Schwab

(57) ABSTRACT

A method for producing phyllosilicate-intercalation compounds with an increased expansion volume and/or a modified onset temperature includes intercalating intercalated compounds in native, expandable phyllosilicates, wherein the native phyllosilicate is subjected to ion exchange with at least one cationic surfactant and, at the same time or in a further step, at least one organic intercalation compound is intercalated in the phyllosilicate, with the proviso that the intercalation of dimethylformamide, chloroform, dimethylacetamide, toluene and dimethylsulfoxide can take place also without a prior ion exchange.

24 Claims, 1 Drawing Sheet

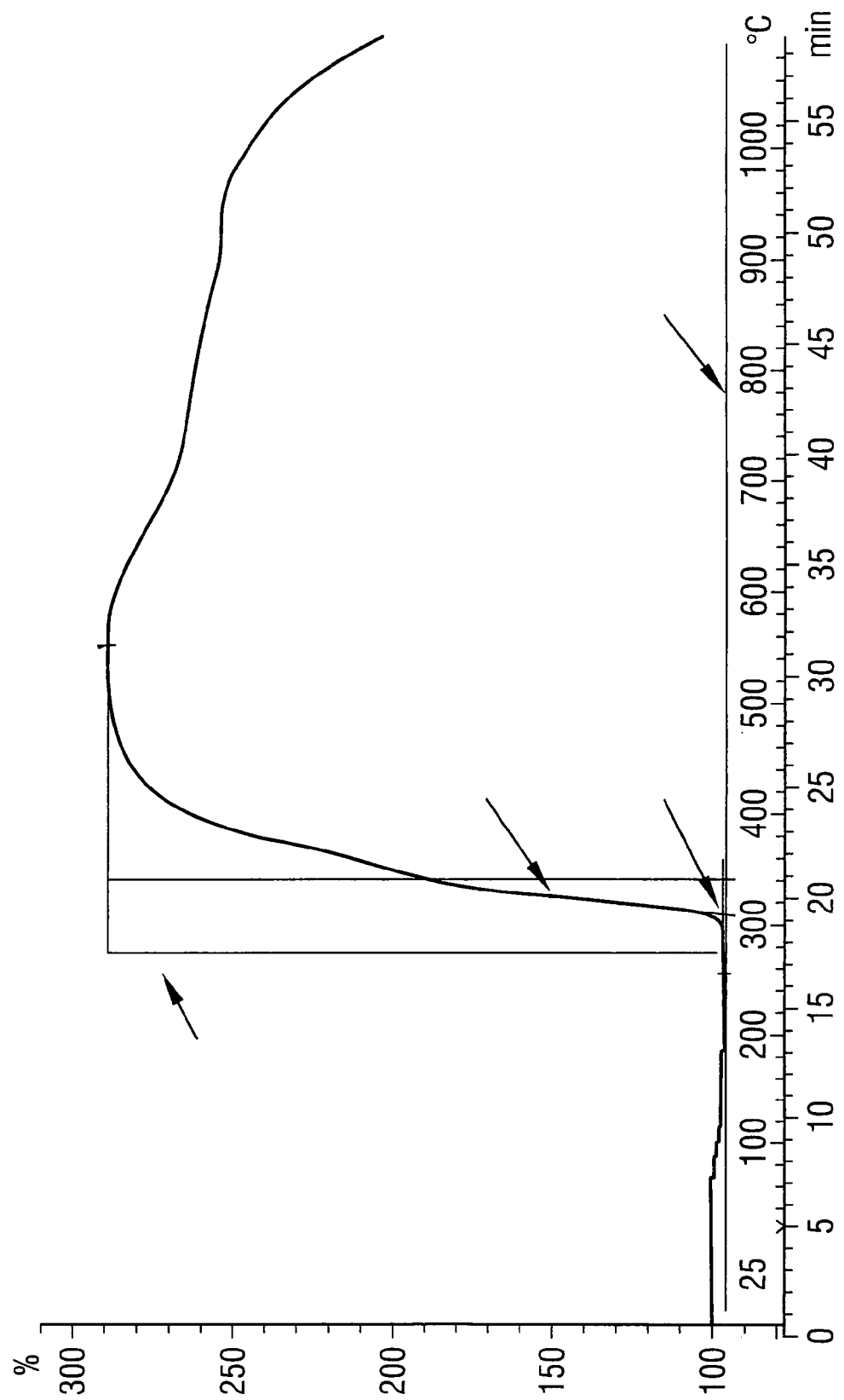

PHYLLOSILICATE-INTERCALATION COMPOUNDS

FIELD OF INVENTION

The present invention relates to a method for producing phyllosilicate-intercalation compounds with an increased expansion volume and/or a modified onset temperature by intercalating intercalate compounds in native, expandable phyllosilicates, especially native vermiculite, the thereby obtained phyllosilicate-intercalation compounds and their use as intumescing material, which can be used as intumescing fire-retarding additive and/or in expanded form as additive for producing fire-retarding materials, as well as for the production of high temperature-resistant insulation panels and seals, especially for the fire-preventing sealing of through holes, wall bushings and other openings in walls, floors and/or ceilings of buildings.

BACKGROUND INFORMATION AND PRIOR ART

Expandable vermiculite and other expandable phyllosilicate compounds are distinguished by their high heat resistance, the good insulating and sealing properties and find use primarily as packaging and absorption materials. Moreover, as intumescing additives in fire-retarding products, they offer a decisive advantage over conventional expandable graphite materials because of their incombustibility.

Expandable phyllosilicates, such as vermiculite, are built up from octahedral and tetrahedral layers, between which exchangeable cations, such as magnesium and aluminum cations are intercalated, the proportions of which vary depending on the origin of the phyllosilicate. Because of the presence of interlayer water, such expandable phyllosilicates are subject to expansion when heated because the interlayer water is released spontaneously at higher temperatures, so that the layers are forced apart. The temperature, at which the expansion process sets in, is referred to as the onset temperature, which is at 320° C., for example, in the case of native, expandable vermiculite, as used in the following comparison example.

Such expandable phyllosilicates, like expandable graphite, are used because of this thermal expansion behavior as intumescing fire-retarding additives for the production of fire-retarding compositions, for example, for the fire-retarding sealing of through holes, wall bushings and other openings in walls, floors and/or corners of buildings. In the event of a fire, the expandable phyllosilicate, present in the fire-retarding composition, expands so that, after the matrix material of the flame-retarding composition has been burned away, the opening, which is to be sealed, remains closed for a further period of time due to the expansion of the phyllosilicate.

Depending on the nature of the pipe wall bushings, such fire-retarding bulkhead systems must satisfy different requirements. For example, in the case of the very rapidly melting and combusting polyurethane pipes, the resulting opening must be closed within a very short time. This requires the intumescing material to have a high expansion rate and a large expansion volume. Accordingly, as in the case of the onset temperature, a high measure of variability is required with regard to these parameters also, for example, in order to be able to adjust the expansion behavior of the intumescing fire-retarding materials selectively to the special product requirement for the production of such fire-retarding materials. In contrast to expandable graphite, which has previously been used as the standard intumescing material, but is burned oxidatively at high temperatures, the expandable phyllosilicates, such as vermiculite, are distinguished by their high thermal stability. However, in native form, these expandable phyllosilicates have only a moderate pressure-increasing expansion behavior, which greatly limits the use of these materials in passive fire protection.

However, due to the limited selection of intercalate compounds (guest), the variations of the expansion properties, particularly of the expansion volume and of the onset temperature, of the commercially obtainable phyllosilicates is limited. However, in order to be able to react flexibly to the special product requirements, especially in the area of passive fire protection, expandable phyllosilicate-intercalation compounds are required, which make possible a higher range of variation and a selective adjustment of their intumescing properties, especially with regard to the expansion volume and the onset, that is, the temperature at which expansion commences.

The modification of expandable phyllosilicates by intercalating guest molecules is already known and is usually carried out by dispersing silicate particles in a solution of the corresponding guest compound. Inorganic salts as well as organic compounds can be intercalated as guest molecules. The onset temperature of commercially available phyllosilicates is about 300° C.

For example, U.S. Pat. No. 4,305,992 describes an intumescing sheet material with a greatly reduced negative expansion behavior, which contains an expandable vermiculite with a particle size of about 0.1 mm to 6 mm, the onset temperature of which has been adjusted by cationic exchange with ammonium phosphate, ammonium carbonate, ammonium acetate, ammonium hydroxide and urea to a temperature, significantly lower than that of conventional vermiculites.

U.S. Pat. No. 5,079,280 and the corresponding European patent application 0 429 246 disclose vermiculite, which can be expanded at a low temperature, and intumescing sheet material, which contains this vermiculite. In this case, the expansion temperature is lowered by intercalating a potassium nitrate solution. Ammonium nitrate, potassium chloride and ammonium chloride are also given as intercalation compound, but are presented as less effective.

U.S. Pat. No. 5,116,537 describes a method for lowering the onset temperature and for improving the expansion properties of vermiculite also with a potassium nitrate solution.

Finally, U.S. Pat. No. 5,326,500 discloses a vermiculite with improved expansion behavior, which was modified by intercalating lithium cations, ($C_2$-$C_6$) alkylammonium cations, allylammonium cations or ammonium ($C_3$-$C_6$) alkylcarboxylic acids.

However, the expandable phyllosilicates, obtained by this state of the art, are not completely satisfactory, because selective matching of the properties of the intumescing fire-retarding additive to the receptive binder matrix of the fire-retarding material cannot be achieved. As already stated above, melting metal and plastic pipes must be squeezed off in the case of passive fire protection by the expanding process of the intumescing materials, in order to close off the cavity, formed by the shrinking process of the pipe wall bushings, quickly once again with formation of a mechanically stable and thermally insulating protective layer. For this purpose, intumescing materials with a pressure-increasing expansion are required, for which the expansion process does not terminate in spite of the resistance or counter pressure, as is it does in the case of the reaction of carbon donors (such as starch and pentaerythritol), acid donors (such as ammonium polyphosphate) and blowing agents (such as melamine).

Moreover, the expansion process may set in only when the binder matrix of the fire-retarding composition has softened, since only then a synergistic effect and the best possible efficiency of the pressure-increasing expansion of the expandable phyllosilicate can be attained. It is therefore necessary to have available expandable phyllosilicates, the properties profile of which can be adjusted selectively and more accurately with respect to the expansion behavior. In this connection, it is particularly important to be able to modify the onset temperature in the desired manner at elevated expansion rates.

OBJECT OF THE INVENTION

It is an object of the present invention to indicate a method, with which native, expandable phyllosilicates can be modified by the intercalation of intercalate compounds in such a manner, that they have an increased expansion volume and, at the same time, enable the onset temperature to be modified.

Surprisingly, it has turned out that it is possible, by exchanging the ions of the native and expandable phyllosilicate for an organic intercalate compound or by intercalating certain organic compounds into the phyllosilicate, the ions of which have not been exchanged, to achieve an increased expansion volume of the material as well to enable the onset temperature to be modified.

SUMMARY OF THE INVENTION

The invention accordingly relates to a method for producing phyllosilicate-intercalation compounds with an increased expansion volume and/or a modified onset temperature by intercalating intercalate compounds in native, expandable phyllosilicates, especially native vermiculite, which is characterized in that the native phyllosilicate is subjected to ion exchange with at least one cationic surfactant and, at the same time or in a further step, at least one organic intercalate compound is intercalated in the phyllosilicate, with the proviso that the intercalation of dimethylformamide, chloroform, dimethylacetamide, toluene and dimethylsulfoxide can take place also without a prior ion exchange.

The onset temperature (° C.), addressed here, is defined as the temperature, at which the thermal expansion process of the intumescing system, that is, of the inventive phyllosilicate-intercalation compounds here, commences. In other words, this is the temperature at the start of the expansion process. The conventional, commercially obtainable, expandable native phyllosilicates, for example, the native vermiculite from China, addressed in Example 1, has an onset temperature of 320° C., if this temperature is determined with the help of the method described below and the measurement conditions given.

The expansion volume (%/mg) is standardized to the amount of phyllosilicate-intercalation compound and corresponds to the difference between the initial volume and the final volume of the completely expanded phyllosilicate-intercalation compound. Further details concerning the determination of this parameter are given further on in the specification.

The inventive method enables the expansion volume to be increased by 4% to 66% in comparison to that of native, expandable vermiculite. At the same time, it is possible to vary the onset temperature from that of 320° C. of native expandable vermiculite to a value ranging from 139° C. to 376° C. With that, there is a significantly better possibility of adapting the expansion behavior of the native vermiculite to the anticipated use conditions of the intended application.

In accordance with a preferred embodiment of the invention, a surface active, quaternary alkylammonium compound is used as cationic surfactant for the ionic exchange of the native expandable phyllosilicate. Particularly preferred is the use of a surface-active quaternary alkylammonium compound of the general formula

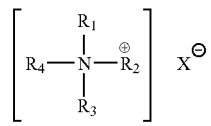

in which $R_1$, $R_2$, $R_3$ and $R_4$ independently of one another represent hydrogen atoms, linear or branched, saturated or unsaturated alkyl groups, cycloalkyl groups, cylcoalkylalkyl groups, alkenyl groups, aryl groups, arylalkyl groups or alkylaryl groups with 1 to 30 and preferably 1 to 18 carbon atoms and X represents an anion with the proviso that at least one of the $R_1$, $R_2$, $R_3$ or $R_4$ groups has 12 to 30 and preferably 12 to 18 carbon atoms. The $X^-$ anions preferably are halogen anions, particularly chloride anions and/or bromide anions but also sulfate and sulfonate anions.

Particularly preferred surface-active quaternary alkylammonium compounds are the optionally substituted $C_{10}$-$C_{18}$-alkyl-tri-$C_1$-$C_6$-alkylammonium salts, $C_{10}$-$C_{18}$-dialkyl-di-$C_1$-$C_6$-alkylammonium salts, $C_{10}$-$C_{18}$-trialkyl-$C_1$-$C_6$-alkylammonium salts and/or $C_{10}$-$C_{18}$-tetraalkylammonium salts. Particularly preferred compounds of this type are decyltrimethylammonium halide, dodecyltrimethylammonium halide, tetradecyltrimethylammonium halide, octadecyltrimethylammonium halide and/or tridecylammonium halide, preferably the chlorides or bromides of these compounds being used.

BRIEF DESCRIPTION OF THE DRAWINGS

Single FIGURE of the drawings shows a diagram illustrating an expansion behavior of an inventive phyllosilicate intercalation compound.

DETAILED DESCRIPTION OF THE PREFERRED EMODIMENTS

According to a first embodiment of the inventive method, the phyllosilicate, obtained in this manner by ion exchange with the cationic surfactant, is treated simultaneously or in a further step with an organic intercalate compound, preferably at least one compound selected from the group comprising monovalent and multivalent aliphatic and aromatic alcohols, monocarboxylic acid and dicarboxylic acid and their alkali or ammonium salts and amides, organic chelating agents and organic solvents.

Pursuant to the invention, a compound of the general formula ROH or $R(OH)_2$ is used as alcohol and a compound of the general formula RCOOH or $R(COOH)_2$ is used as monocarboxylic or dicarboxylic acid, in which R is a linear or branched, saturated or unsaturated alkyl group, cycloalkyl group, cycloalkylalkyl group, alkenyl group, aryl group, arylalkyl group or alkylaryl group with 1 to 30 and preferably 1 to 14 carbon atoms.

Particularly preferred organic intercalate compounds are methanol, ethanol, 2-propanol, 2-butanol, t-butanol, benzyl alcohol, 1-decanol, ethylene glycol, 1,3-dihydroxypropane, 1,4-dihydroxybutane, glycerin, formic acid, acetic acid, hexanoic acid, adipic acid, malonic acid, gluconic acid, glycolic acid, lactic acid, glyoxylic acid, trifluoroacetic acid, dimethylmalonate, diethylmalonate, methylsalicylate, malonic acid diamide, dimethylformamide, dimethylsulfoxide, nitromethane, acetone, tetrahydrofuran, chloroform, diethyl ether, diphenyl ether, toluene, ethylenediaminetetraacetic acid (EDTA) and/or their metal complexes, especially the Mg-EDTA complex and/or the Cu-EDTA complex.

In accordance with a particularly preferred embodiment, ethanol, acetic acid, citric acid, malonic acid, gluconic acid, ethylenediaminetetraacetic acid, nitrilotriacetic acid or the alkali metal salts and amides of these carboxylic acids, urea and/or dimethylformamide are used as organic intercalate compounds.

The inventive method can be carried out preferably, in that, in a first step, the ion exchange is brought about by treating the native, expandable phyllosilicate with at least one cationic surfactant and, in a second step, the treatment with at least one organic intercalate compound is carried out.

Preferably, the native phyllosilicate is suspended for this purpose in a solution of the cationic surfactant in a suitable solvent, the intercalation is brought about, optionally with heating, the ion-exchanged phyllosilicate is separated from the suspension, washed and optionally dried and then the organic intercalate compound is intercalated optionally from a solution in a suitable solvent into the ion-exchanged phyllosilicate, after which the phyllosilicate-intercalation compound is removed from the suspension, washed and optionally dried.

In accordance with a further embodiment of the invention, the ion exchange with the cationic surfactant and the intercalation of the organic intercalate compound into the native phyllosilicate is brought about in one step. For this purpose, the cationic surfactant and the inorganic intercalate compound are used preferably in the form of a mixture with the mixing ratio aimed for in the phyllosilicate-intercalation compound.

In this case, preferably the native phyllosilicate is suspended in a solution of the cationic surfactant and the organic intercalate compound is suspended in a suitable solvent, the simultaneous ion exchange and intercalation are brought about optionally with heating and the phyllosilicate-intercalation compound obtained is removed from the suspension, washed and optionally dried.

For the two procedures, the organic intercalate compound is intercalated preferably by the exchange of the interlayer water of the phyllosilicate.

Pursuant to the invention, vermiculite, hydrobiotite and/or chlorite-vermiculite with an average particle diameter of 0.1 mm to 10 mm and preferably of 0.3 mm to 1.0 mm are used as native expandable phyllosilicate.

For the inventive method, preferably water, an aliphatic or aromatic alcohol, an ether, an ester, an alkane, a cycloalkane, an aromatic solvent and/or an amine are used as solvent.

Furthermore, the method preferably is carried out at a concentration of cationic surfactant or organic intercalate compound in the solution of 0.01 moles/L to 5.0 moles/L and preferably of 0.1 moles/L to 1.0 moles/L.

The ion exchange reaction for the intercalation reaction advantageously is carried out at a temperature ranging from 10° C. to 150° C., preferably of 25° C. to 60° C. and particularly at room temperature with a reaction time of 0.5 to 144 hours and preferably of 10 to 36 hours.

The phyllosilicate-intercalation compound, obtained by the inventive method, is separated from the suspension preferably by filtering or decanting, washed with a few milliliters of the solvent used and then optionally dried. The drying can be carried out at room temperature, under vacuum or in a drying oven at room temperature or at an elevated temperature. Preferably, it is carried out in a drying oven for 1 hour to 12 hours at a temperature of 60° C. to 80° C.

A further object of the invention are the phyllosilicate-intercalation compounds, obtainable by the method described, as well as their use as intumescent material, which can be used as such as intumescing fire-retarding additive and/or in expanded form as additive for the production of flame-retarding materials, as well as for the production of high temperature-resistant insulation panels and seals, especially for the fire-preventing sealing of through holes, wall bushings and other openings in walls, floors and/or ceilings of buildings. For this purpose, these phyllosilicate-intercalation compounds are brought into matrix material in a manner conventionally used for such applications, in amounts necessary for the intended expansion effect.

The above-addressed parameters of expansion volume and onset temperature of the phyllosilicate-intercalation compound obtainable pursuant to the invention, which are given in the examples below, are measured by thermomechanical analysis (TMA). With thermomechanical analysis (TMA), dimensional changes in the phyllosilicate-intercalation compound are measured as a function of temperature and time. For this purpose, the sample is placed on a sample carrier and the dimensional change of the sample is measured and recorded with the help of a measuring probe as a function of the heating temperature and the heating time. For this purpose, the platelet shaped sample of phyllosilicate-intercalation compound is transferred to a corundum crucible, which is covered with a steel crucible. This steel crucible ensures that, as the sample expands, the dimensional change of the sample is transferred smoothly to the measuring probe, which is in mechanical contact with the upper side of the steel crucible and can be acted upon with an adjustable load.

The following conditions were maintained for determining the expansion behavior using this measuring equipment:

| | |
|---|---|
| Apparatus: | TMA/SDTA840 of Mettler/Toledo, Gießen, DE |
| Temperature program: | dynamic mode (with prior isothermal phase for 5 minutes at 25° C.) |
| Heating rate: | 20° C./min |
| Temperature range: | 25° C. to 1100° C. |
| Analysis gas: | synthetic air |
| Flow rate: | 60 mL/min |
| Load: | 0.06 N |
| Sample vessel: | 150 µL corundum crucible + 150 µL steel crucible (as lid) |

As a result of the thermomechanical analysis, carried out in this way, the TMA curve of a phyllosilicate intercalation compound, shown in the drawing FIGURE is obtained.

As shown in this FIGURE, the onset temperature (° C.) mathematically represents the intersection of the baseline before the change in length of the sample and the tangent at the point of inflection of the expansion curve.

The expansion volume corresponds to the horizontal step between the baseline and the maximum of the curve. It gives the expansion of the substance in percent. Since the volume in the case of these measurements depends on the sample weight, the expansion volume is standardized to the sample weight (expansion) is therefore stated in units of %/mg.

All measurements of the parameters given in the following Examples were carried out with phyllosilicate samples of comparable particle sizes ranging from 0.3 to 1.0 mm. This was ensured by screening the respective phyllosilicate types.

When the phyllosilicate-intercalation compounds, obtainable pursuant to the invention, are used as intumescing fire-retarding additives, a lower or higher onset temperature is required depending on the application, whereas preferably an increased expansion volume is required at all times. These properties must be matched to the melting behavior of the cable and pipe wall bushings. Pursuant to the invention, it is readily possible to match the start of the expansion of the phyllosilicate-intercalation compound precisely to the area of use and, in this way, to achieve a higher variability of the intumescing materials for passive fire protection.

The phyllosilicate-intercalation compounds, obtainable pursuant to the invention, expand when heated to the onset temperature. This heating can be carried selectively in an oven for producing correspondingly expanded products or by other heat sources, if present, such as fire, light radiation or electric pulses. This is also so if the phyllosilicate-intercalation compounds are embedded in a binder matrix with formation of a fire-retarding sealing composition. In this connection, it should also be noted that the phyllosilicate-intercalation compounds, produced pursuant to the invention, also expand under load and, with that, are capable of releasing very strong expansion forces. This is of importance particularly for their use as intumescing material.

The following Examples are intended to explain the invention further.

EXAMPLE 1 (COMPARISON)

This Example illustrates only how the onset temperature and the expansion volume are determined analytically by means of native, conventional, commercial vermiculite from China.

Commercial, native vermiculite (20 mg) is weighed into a 150 μL corundum crucible and covered with a 150 μL steel crucible as lid, in order to achieve a uniform distribution of the load of 0.06N. In this connection, the steel crucible should be wide enough to dip into the corundum crucible in order to guarantee that the device is adequately stable. Subsequently, the sample arrangement is placed on the sample stage of the TMA device, so that the measurement probe (quartz glass stirrup) contacts the bottom of the steel cable centrally. In this way, it is guaranteed than any change in length of the sample is recorded without interference by the measurement probe. The sample is weighed down by a constant load of 0.06 N and heated at a rate of 20° C./min to 1100° C. The change in length is measured as a function of the temperature.

The curve obtained shows that the thermal expansion of the native vermiculite commences at 320° C., which corresponds to the onset temperature, and that the expansion volume is 14.8%/mg.

EXAMPLE 2

Intercalation of Ethylene Glycol in Vermiculite after Ion Exchange with Decyltrimethylammonium Bromide In a 100 mL beaker, 3 g (0.05 moles) of native vermiculite are stirred in 10 mL of a 0.1 molar aqueous solution of decyl-trimethylammonium bromide and the cationic surfactant is allowed to act for 48 hours.

For the working up, the supernatant solution is decanted and the residue washed with a few milliliters of water. Subsequently, the vermiculite, ion-exchanged in this manner, is treated with 10 mL of ethylene glycol in a 50 mL beaker. After a reaction time of 48 hours, the supernatant liquid is decanted off and the residue dried for 6 hours at 60° C.

TMA analysis revealed an onset temperature of 296° C. and a standardized expansion volume of 18.5 (%/mg).

EXAMPLE 3

Intercalation of Ethylenediaminetetraacetic Acid (EDTA) in Vermiculite Ion-exchanged with Decyltrimethylammonium Bromide Vermiculite (3 g, 0.05 moles) is transferred to 20 mL of an aqueous solution, which contains 0.01 moles of decyltrimethylammonium bromide and 0.05 moles of EDTA and this reaction mixture is allowed to act for 72 hours. The product is worked up by decanting the supernatant solution, washed with 100 mL of water in portions and subsequently dried for 6 hours at 60° C.

TMA analysis reveals an onset temperature of 248° C. and a standardized expansion volume of 20.8 (%/mg).

EXAMPLE 4

Intercalation of Ethylenediaminetetraacetic Acid in Ion-exchanged Vermiculite

Native vermiculite (3 g, 0.05 moles) is treated in a 100 mL beaker with 10 mL of a 0.1 molar solution of decyltrimethylammonium bromide. The material is removed and washed with water and the product obtained is subsequently treated with 10 mL of a 0.1 molar, aqueous solution of ethylenediaminetetraacetic acid. After a reaction time of 48 hours, the supernatant solution is decanted off, the residue washed with a few milliliters of water and dried for 6 hours at 60° C.

TMA analysis revealed an onset temperature of 179° C. and a standardized expansion volume of 22.8 (%/mg).

In the same way, the intercalation of further organic compounds was carried out in a vermiculite, ion-exchanged with a cationic surfactant. The materials used here and the onset temperature and expansion volume of the phyllosilicate-intercalation compounds obtained are given in the following Table 1.

TABLE 1

| Host Type | Intercalate | Onset Temperature [° C.] | Expansion Volume Standardized [%/mg] |
|---|---|---|---|
| Nativer Vermiculite | —(Comparison) | 320 | 14.8 |
| C10NBr* | EDTA | 179 | 22.8 |
| C14NBr** | Sodium Gluconate | 191 | 18.4 |
| C10NBr | Sodium Gluconate | 198 | 18.3 |
| C14NBr | EDTA | 218 | 20.3 |
| C10NBr | Acetic Acid | 273 | 15.5 |
| C10NBr | DMF | 273 | 24.6 |
| C14NBr | DMF | 280 | 22.9 |
| C12NBr | DMF | 281 | 25.1 |
| C14NBr | Ethanol | 291 | 18.1 |

TABLE 1-continued

| Host Type | Intercalate | Onset Temperature [° C.] | Expansion Volume Standardized [%/mg] |
|---|---|---|---|
| C10NBr | Ethylene Glycol | 296 | 18.5 |
| C10NBr | Urea | 300 | 16.6 |
| C10NBr | Ethanol | 311 | 16.6 |
| C14NBr | Ethylene Glycol | 333 | 19.0 |
| C14NBr | Urea | 348 | 22.3 |
| C14NBr | Acetic Acid | 354 | 18.2 |
| C10NBr | Malonic Acid Diamide | 358 | 16.6 |
| C14NBr | Malonic Acid Diamide | 376 | 15.5 |
| Native Vermiculite | C10NBr/EDTA (1:10) | 245 | 21.6 |
| Native Vermiculite | C10NBr/EDTA (1:05) | 248 | 20.8 |
| Native Vermiculite | C10NBr/EDTA (1:1) | 265 | 21.2 |
| Native Vermiculite | C10NBr/EDTA (1:06) | 268 | 21.4 |
| Native Vermiculite | C10NBr/EDTA (1:03) | 281 | 22.6 |

*C10NBr = Decyltrimethylammonium bromide
**C14NBr = Tetradecyltrimethylammonium bromide From the above Table 1, it can be seen that it is readily possible to adjust the onset temperature and the expansion volume of the native vermiculite selectively in the desired manner by varying the nature of the reaction participant.

EXAMPLE 5

The following Example illustrates a further alternative of the inventive method, according to which dimethylformamide (DMF), chloroform, toluene, dimethylacetamide and dimethylsulfoxide (DMSO) are intercalated in the native, expandable phyllosilicate as organic compounds without a prior ion exchange.

Intercalation of Dimethylformamide in Vermiculite

Native vermiculite (3 g, 0.05 moles) is wetted completely with 10 mL of dimethylformamide and the organic compound is allowed to act for not more than 5 minutes. Directly afterwards, the product is worked up by filtering or decanting and drying. The purification step by washing by solvent can be omitted.

TMA analysis revealed an onset temperature of 281° C. and a standardized expansion volume of 26.5 (%/mg).

Native vermiculite, treated in the same way with dimethylsulfoxide, dimethylacetamide and toluene resulted in vermiculite intercalation compounds with the onset temperatures and expansion volumes given in the following Table 2.

TABLE 2

| Host Type | Intercalate | Onset Temperature [° C.] | Expansion Volume Standardized [%/mg] |
|---|---|---|---|
| Native Vermiculite | DMSO | 267 | 16.6 |
| Native Vermiculite | DMF | 274 | 26.5 |
| Native Vermiculite | Dimethylacetamide | 284 | 20.7 |
| Native Vermiculite | Toluene | 296 | 17.4 |

It is also clear from the above Table 2 that, with the help of the inventive procedure, it is possible to adjust the onset temperature and the expansion of native vermiculite in the desired manner.

What is claimed is:

1. A method for producing phyllosilicate-intercalation compounds with an increased expansion volume and/or a modified onset temperature by intercalating intercalate compounds in native, expandable phyllosilicates, especially native vermiculite, characterized in that the native phyllosilicate is subjected to ion exchange with at least one cationic surfactant and, at the same time or in a further step, at least one organic intercalate compound is intercalated in the phyllosilicate, with the proviso that the intercalation of dimethylformamide, chloroform, dimethylacetamide, toluene and dimethylsulfoxide can take place also without a prior ion exchange.

2. The method of claim 1, wherein a surface-active, quaternary alkylammonium compound is used as cationic surfactant.

3. The method of claim 2, wherein, as cationic surfactant, a surface-active quaternary alkylammonium compound of the general formula

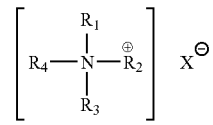

is used, in which $R_1$, $R_2$, $R_3$ and $R_4$ independently of one another represent hydrogen atoms, linear or branched, saturated or unsaturated alkyl groups, cycloalkyl groups, cylcoalkylalkyl groups, alkenyl groups, aryl groups, arylalkyl groups or alkylaryl groups with 1 to 30 and preferably 1 to 18 carbon atoms and $X^-$ represents an anion with the proviso that at least one of the $R_1$, $R_2$, $R_3$ or $R_4$ groups has 12 to 30 and preferably 12 to 18 carbon atoms.

4. The method of claim 3, wherein, as surface-active quaternary alkylammonium compounds, an optionally substituted $C_{10}$-$C_{18}$-alkyl-tri-$C_1$-$C_6$-alkylammonium salts, $C_{10}$-$C_{18}$-dialkyl-di-$C_1$-$C_6$-alkylammonium salts, $C_{10}$-$C_{18}$-trialkyl-$C_1$-$C_6$-alkylammonium salts and/or $C_{10}$-$C_{18}$-tetraalkyl-ammonium salts is used.

5. The method of claim 4, wherein, as surface-active quaternary ammonium compound, decyltrimethylammonium halide, dodecyltri-methylammonium halide, tetradecyltrimethylammonium halide, octadecyl-trimethylammonium halide and/or ammonium halide, preferably the chloride or bromides of these compounds are used.

6. The method of claim 1, wherein, as organic intercalated compound, at least one compound, selected from the group comprising monovalent and multivalent, aliphatic and aromatic alcohols, monocarboxylic acid and dicarboxylic acid and their alkali or ammonium salts and amides, organic chelating agents and organic solvents, is used.

7. The method of claim 5, wherein a compound of the general formula ROH or R(OH)$_2$ is used as alcohol and a compound of the general formula RCOOH or R(COOH)$_2$ is used as monocarboxylic or dicarboxylic acid, in which R is a linear or branched, saturated or unsaturated alkyl group, cycloalkyl group, cycloalkylalkyl group, alkenyl group, aryl group, arylalkyl group or alkylaryl group with 1 to 30 and preferably 1 to 14 carbon atoms.

8. The method of claim 1, wherein, as organic intercalation compound, methanol, ethanol, 2-propanol, 2-butanol, t-butanol, benzyl alcohol, 1-decanol, ethyleneglycol, 1,3-dihydroxypropane, 1,4-dihydroxy-butane, glycerin, formic acid, acetic acid, hexanoic acid, adipic acid, malonic acid, gluconic acid, glycolic acid, lactic acid, glyoxylic acid, trifluoroacetic acid, dimethylmalonate, diethylmalonate, methylsalicylate, malonic acid diamide, dimethylformamide, dimethylsulfoxide, nitromethane, acetone, tetrahydrofuran, chloroform, diethyl ether, diphenyl ether, toluene ethylenediaminetetraacetic acid (EDTA) and/or their metal complexes, especially the Mg-EDTA complex and/or the Cu-EDTA complex are intercalated.

9. The method of claim 8, wherein, as intercalate compound, ethanol, acetic acid, citric acid, malonic acid, gluconic acid, ethylene-diaminetetraacetic acid, nitrilotriacetic acid or the alkali metal salts and amides of these carboxylic acids, urea and/or dimethylformamide are used as organic intercalate compounds are intercalated.

10. The method of claim 1, wherein, in a first step, the ion exchange is brought about by treating the native, phyllosilicate with at least one cationic surfactant and, in a second step, with at least one organic intercalate compound.

11. The method of claim 10, wherein the native phyllosilicate is suspended in a solution of the cationic surfactant in a suitable solvent, the intercalation is brought about optionally using heat, the ion-exchanged phyllosilicate is removed from the suspension, optionally washed and dried and the organic intercalate compound is then intercalated into the ion-exchanged phyllosilicate optionally from a solution in a suitable solvent and the phyllosilicate-intercalation compound obtained is removed from the suspension, washed and optionally dried.

12. The method of claim 1, wherein the ion exchange with the cationic surfactant and the intercalation of the organic intercalate compound in the native phyllosilicate is carried out in one step.

13. The method of claim 12, wherein the cationic surfactant and the organic intercalate compound are used in the form of a mixture with the mixing ratio aimed for in the phyllosilicate-intercalation compound.

14. The method of claim 13, wherein the native phyllosilicate is suspended in a solution of the cationic surfactant and the organic intercalate compound is suspended in a suitable solvent, the simultaneous ion exchange and intercalation optionally are brought out with heating and the phyllosilicate-intercalation compound obtained is removed from the suspension, washed and optionally dried.

15. The method of claim 10, wherein the organic intercalate compounds are intercalated by the exchange of interlayer water of the phyllosilicate.

16. The method of claim 1, wherein, as native, expandable phyllosilicate, vermiculite, hydrobiotite and/or chlorite vermiculite with an average particle diameter of 0.1 mm to 10 mm and preferably of 0.3 to 1.0 mm is used.

17. The method of claim 10, wherein water, an aliphatic or aromatic alcohol, an ether, an ester, an alkane, a cycloalkane, an aromatic solvent and/or an amine is used as solvent.

18. The method of claim 10, wherein a concentration of the cationic surfactant or of the organic intercalate compound in the solution of 0.01 moles/L to 5.0 moles/L and preferably of 0.1 moles/L to 1.0 moles/L is employed.

19. The method of claim 10, wherein the ion exchange reaction or the intercalation reaction is carried out a temperature of 10° C. to 150° C. and preferably of 25° C. to 60° C.

20. The method of claim 10, wherein ion exchange reaction or the intercalation reaction is carried out during a reaction time of 0.5 to 144 hours and preferably from 10 to 36 hours.

21. The method of claim 10, wherein the phyllosilicate-intercalation compound is removed from suspension by filtering or decanting, washed with a few milliliters of the solvent used and then optionally dried.

22. The method of claim 21, wherein drying is carried out at room temperature, under vacuum or in a drying oven at an elevated temperature.

23. The method of claim 22, wherein drying in the drying oven is carried out from 1 to 12 hours at a temperature of 60° C. to 80° C.

24. Phyllosilicate-intercalation compound, obtainable by intercalating intercalate compounds in native, expandable phyllosilicates, especially native vermiculite, characterized in that the native phyllosilicate is subjected to ion exchange with at least one cationic surfactant and, at the same time or in a further step, at least one organic intercalate compound is intercalated in the phyllosilicate, with the proviso that the intercalation of dimethylformamide, chloroform, dimethylacetamide, toluene and dimethylsulfoxide can take place also without a prior ion exchange.

* * * * *